UNITED STATES PATENT OFFICE.

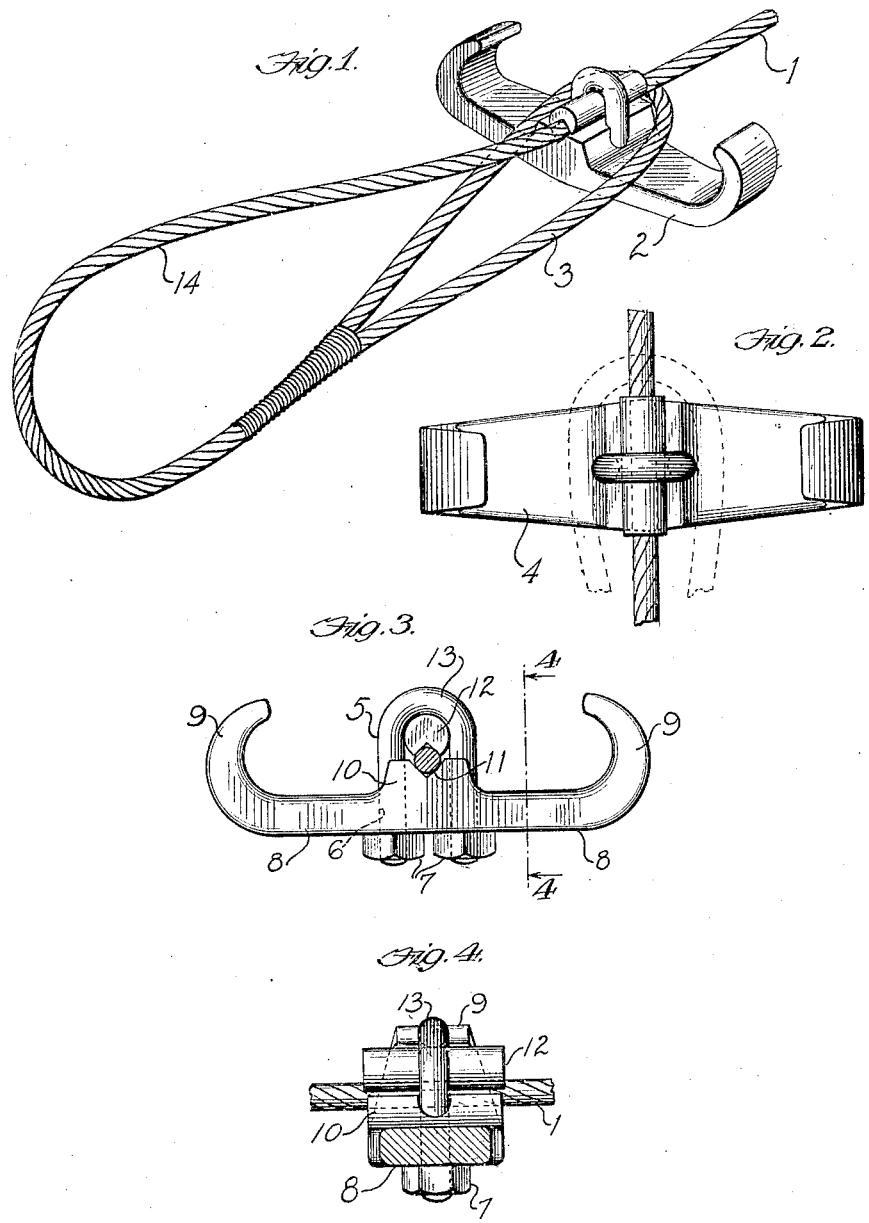

CONRAD B. OSMUNDSEN, OF CHICAGO, ILLINOIS.

TOWING-CABLE.

1,345,873.     Specification of Letters Patent.     Patented July 6, 1920.

Application filed July 21, 1919. Serial No. 312,392.

*To all whom it may concern:*

Be it known that I, CONRAD B. OSMUNDSEN, a citizen of the United States of America, and a resident of Chicago, county of Cook, and State of Illinois, have invented certain new and useful Improvements in Towing-Cables, of which the following is a specification.

The main objects of this invention are to provide an improved form of towing device having improved means for conveniently attaching to it the axles of motor vehicles and the like.

An illustrative embodiment of this invention is shown in the accompanying drawings, in which—

Figure 1 is a perspective view of one end of an automobile towing cable, both ends being alike.

Fig. 2 is a plan of the toggle secured to a cable, the latter being indicated as broken away and one of its looped ends being shown in dotted outline.

Fig. 3 is a side view of the toggle, the running part of the cable being shown in section.

Fig. 4 is a section on the line 4—4 of Fig. 3.

In the embodiment of the invention shown in the drawings, the towing device comprises a cable 1 to which are secured two toggles 2, suitably placed to engage loops at the respective ends of the cable, only one end of the towing device being shown in the drawings.

The cable 1 may be made of rope or wire and is provided at each end thereof with an eye 3.

The toggles 2 are made of metal, hard wood, or other suitable material and each comprises a cross-piece 4 having apertures 6 for a U-bolt 5, the spaced legs of which are threaded to receive nuts 7 by means of which the U-bolt is adjusted. The ends of the cross-piece form a pair of lateral arms 8 disposed one on each side of the U-bolt, extending outwardly therefrom and preferably bent to form a pair of horns 9. A boss 10 having a groove 11 is formed on the cross-piece so as to be located between the spaced legs of the U-bolt, and provides a seat for the running part of the cable 1. A shoe 12 is loosely supported between the boss 10 and the base 13 of the U-bolt, and is adapted to be forced by the shifting of the U-bolt into frictional contact with the cable when the cable is seated in the boss 10.

The toggles are spaced inwardly from the ends of the cable so that when the eyes 3 engage the respective toggles, the cable will form a loop 14 at each end thereof for engaging the axle or other part of a vehicle. In operation, after the end of the cable has been passed around the axle of the vehicle, the eye 3 is passed over the curved ends of the arms 8 so as to be supported on the toggle between the arms 8 and the running part of the cable, as shown in Fig. 1. When a pull is exerted on the cable, the outer end of each of the eyes 3 abuts against the opposed face of the adjacent boss and the horns 9 secure the eye against accidental disengagement from the toggle.

Although but one specific embodiment of this invention has been herein shown and described, it will be understood that numerous details of the construction shown may be altered or omitted without departing from the spirit of this invention as defined by the following claims.

I claim:

1. A towing device, comprising a cable having an eye formed at one end thereof and a toggle rigidly secured to the running part of said cable, said eye being passed over said toggle to engage the same and form a loop in said cable at one end thereof, said toggle having oppositely extending arms and means on the ends of said arms to retain said eye in position on said toggle.

2. A towing device, comprising a cable having an eye formed at one end thereof and a toggle rigidly secured to the running part of said cable, said eye being passed over said toggle to engage the same and form a loop in said cable at one end thereof, said toggle having oppositely extending arms, the ends of which are turned upwardly to provide horns to retain said eye in position on said toggle.

3. A towing device, comprising a cable having an eye formed at one end thereof, a toggle having a boss formed thereon intermediate the ends thereof to provide a seat for said cable, a U-shaped bolt having the arms thereof extending through said toggle on opposite sides of said seat for rigidly clamping said cable on said seat, said eye being passed over said toggle to engage the same and form a loop in said cable at one end thereof.

Signed at Chicago this 15th day of July, 1919.

CONRAD B. OSMUNDSEN.